No. 839,417.　　　　　　　　　　　　　PATENTED DEC. 25, 1906.
W. H. PIERCE.
WHEEL.
APPLICATION FILED APR. 21, 1906.
2 SHEETS—SHEET 1.
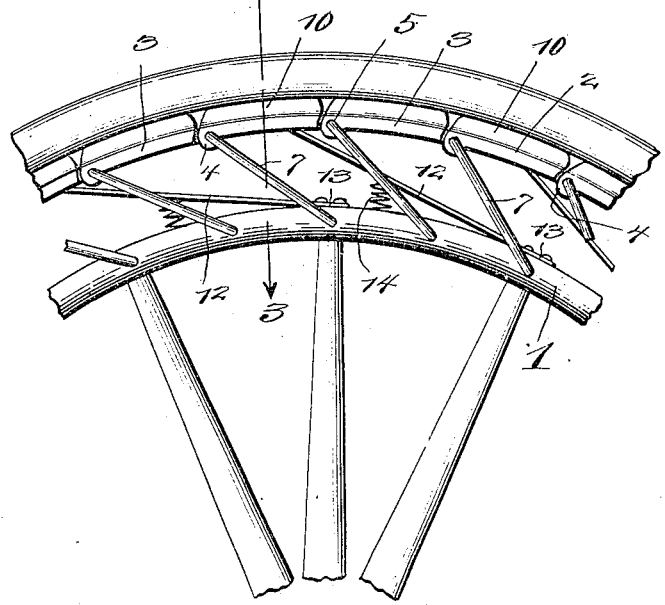
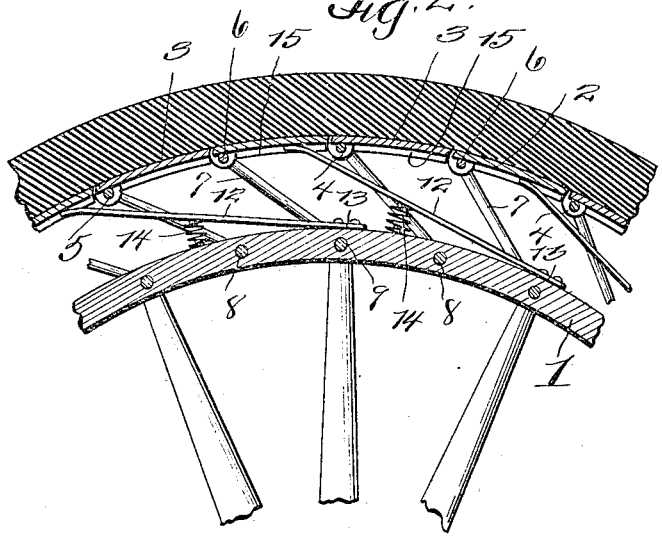
Witnesses
R. A. Boswell
W. E. Oliver
Inventor
W. H. Pierce,
By Swift & Co. his Attorneys No. 839,417. PATENTED DEC. 25, 1906.
W. H. PIERCE.
WHEEL.
APPLICATION FILED APR. 21, 1906.
2 SHEETS—SHEET 2.
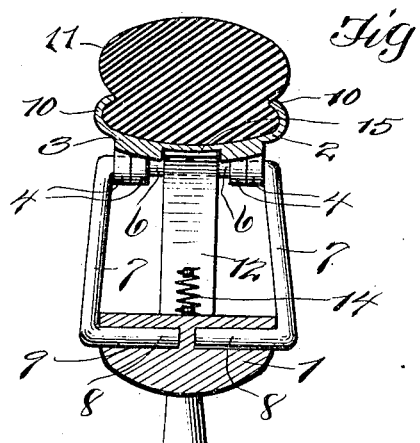
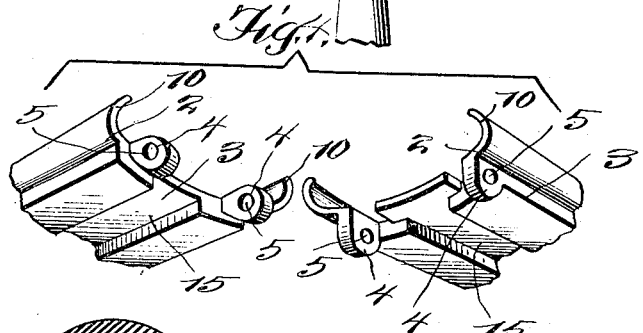
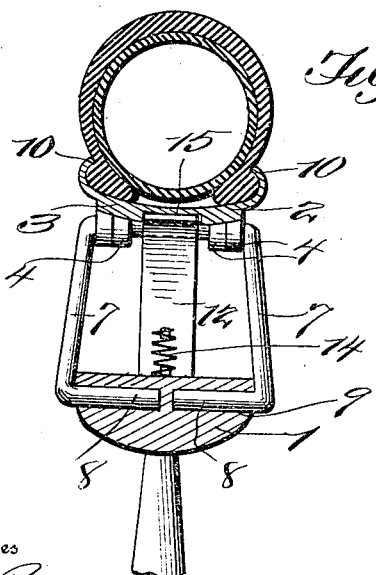
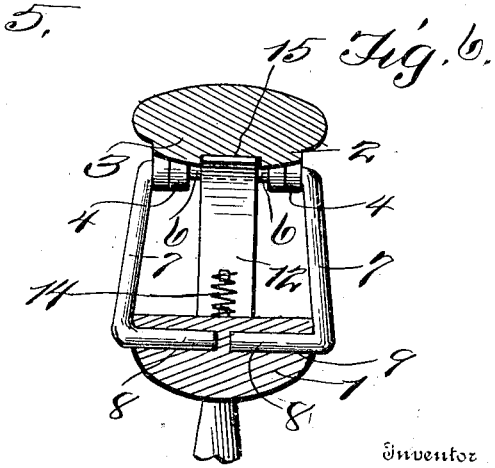
Witnesses
R. W. Boswell
W. E. Oliver
Inventor
W. H. Pierce
By Swift & Co.
His Attorneys

UNITED STATES PATENT OFFICE.

WILLIAM HENRY PIERCE, OF MAQUON, ILLINOIS, ASSIGNOR OF ONE-THIRD TO JOSEPH HOXWORTH AND ONE-THIRD TO HENDERSON WOODS, OF MAQUON, ILLINOIS.

WHEEL.

No. 839,417.

Specification of Letters Patent.

Patented Dec. 25, 1906.

Application filed April 21, 1906. Serial No. 312,963.

*To all whom it may concern:*

Be it known that I, WILLIAM HENRY PIERCE, a citizen of the United States, residing at Maquon, in the county of Knox and State of Illinois, have invented certain new and useful Improvements in Wheels; of which the following is a specification, reference being had therein to the accompanying drawings.

This invention relates to certain new and useful improvements in vehicle-wheels, but mainly to that class of wheels which are used in connection with automobiles and bicycles.

The most essential object of the invention is to provide a mechanically-constructed wheel having considerable resiliency without the employment of a pneumatic tire, in lieu of which a solid-rubber tire is employed, as shown in the drawings; but it is to be understood that it is obvious as to which tire is preferable, because either one is adaptable in practice. When the pneumatic tire is employed, the resiliency or cushion is increased by the amount which is produced by a pneumatic tire when used in connection with a solid rim.

This invention comprises further objects and advantages and combinations of elements, which will be hereinafter more fully described, shown in the accompanying drawings, and the novel features thereof will be pointed out by the appended claim.

To obtain a full and correct understanding of the details of construction, combinations of features, elements and advantages, reference is to be had to the hereinafter-set-forth description and the accompanying drawings in connection therewith, wherein—

Figure 1 is a side elevation of a portion of a wheel illustrated in accordance with the invention. Fig. 2 is a longitudinal section through Fig. 1. Fig. 3 is a cross-section on line 3 3 of Fig. 1. Fig. 4 is a detail view of the hinge-plate. Fig. 5 is a view similar to Fig. 3, only showing a pneumatic tire employed therewith. Fig. 6 is a view similar to Fig. 3, whereby obviating the employment of either tire.

Making renewed reference to the accompanying drawings, wherein similar reference characters indicate corresponding parts in the several illustrations by figures, 1 designates the usual rim, and 2 indicates the supplemental rim, which is composed of a plurality of link-plates 3, joined together in sequence by means of lugs 4, integral with the opposite ends of each link-plate, which lugs are provided with apertures 5 to receive the horizontal portion 6 of spring-steel loops 7, the bent ends 8 of which are received by the apertures 9 of the rim 1, as shown clearly in Figs. 3 and 5 of the accompanying drawings.

Each link-plate is provided with the usual shaped flange 10 to receive either the pneumatic or solid tire 11, as shown clearly in Figs. 3 and 5 of the drawings.

The horizontal portion 6 of the loops 7 acts as a bolt to hinge the link-plates together, as shown in Fig. 1.

Superimposed between the rim 1 and the supplemental rim 2 to provide resiliency between them are a plurality of steel leaf-springs 12, the ends of which are riveted to the rim 1, as at 13, and their opposite ends bear against the link-plates 3, as shown in Figs. 1 and 2 of the drawings.

To provide additional resiliency, coil-springs 14 are disposed between the leaf-springs and the upper surface of the rim 1, as also shown in Figs. 1 and 2 of the drawings.

The link-plates may be so formed as to obviate either form of tire, as shown in Fig. 6 of the drawings. Each link-plate is provided with a longitudinal recess 15 to receive the leaf-spring as it is depressed when pressure is applied upon the wheel.

From the foregoing the essential features, elements, and the construction of the device, together with the simplicity thereof, will be clearly observed, and when manufactured in accordance with the invention an inexpensive market will be easily obtained therefor.

Having thus fully described the invention, what is claimed as new and useful by the protection of Letters Patent is—

In an automobile-wheel, a rim, a plurality of link-plates forming a supplemental rim, lugs integral with the opposite ends of each link-plate and having apertures therein, steel-spring loops a portion of which is received by the apertures to join the rims movably together, leaf-springs to provide resiliency for the rims, coil-springs to provide additional resiliency for the leaf-springs and the link-plates having flanges to receive the tire.

In testimony whereof I hereunto affix my signature in presence of two witnesses.

WILLIAM HENRY PIERCE.

Witnesses:
D. H. HARTSOOK.
JAS. C. McKEE.